June 14, 1932.  J. POWELL  1,862,607
FRAME BRACING AND ADJUSTING MEANS
Filed May 15, 1930  2 Sheets-Sheet 2
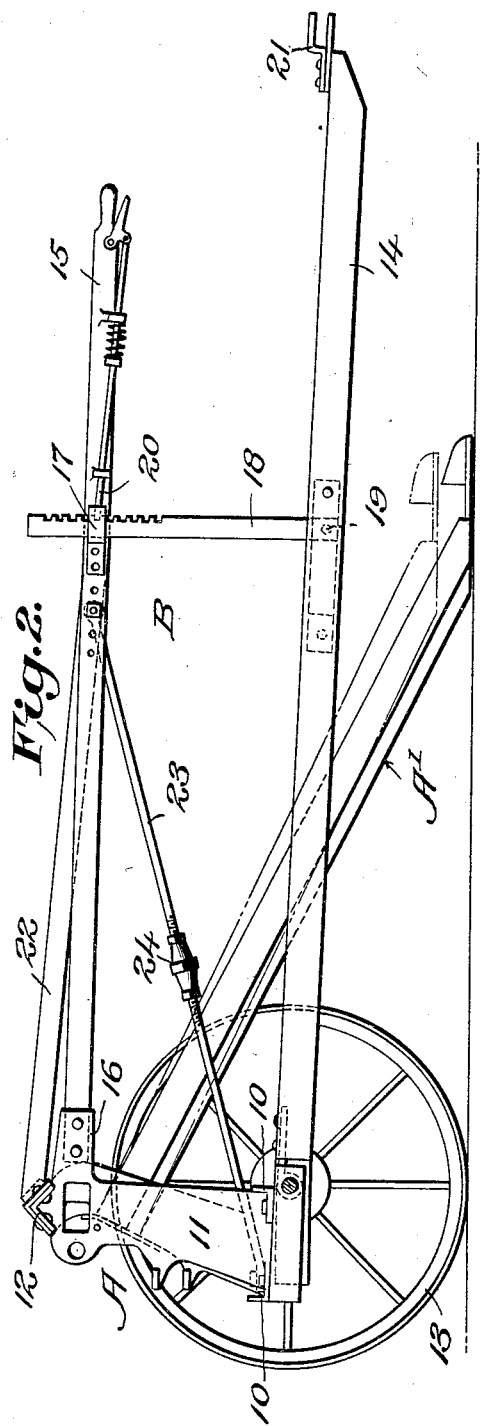
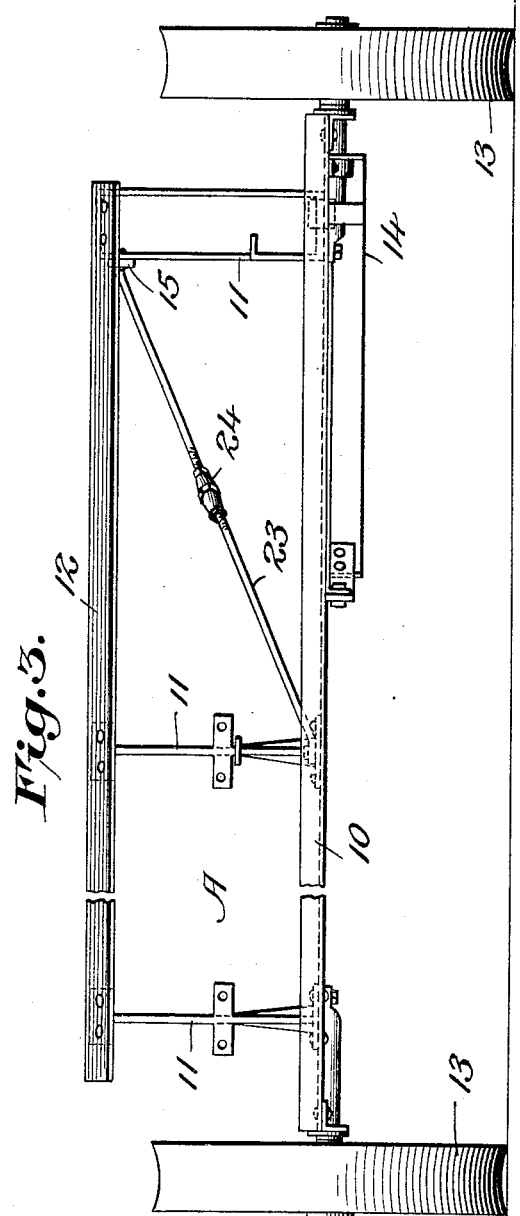
Inventor
John Powell,
By D. P. Wochampter
Attorney Patented June 14, 1932

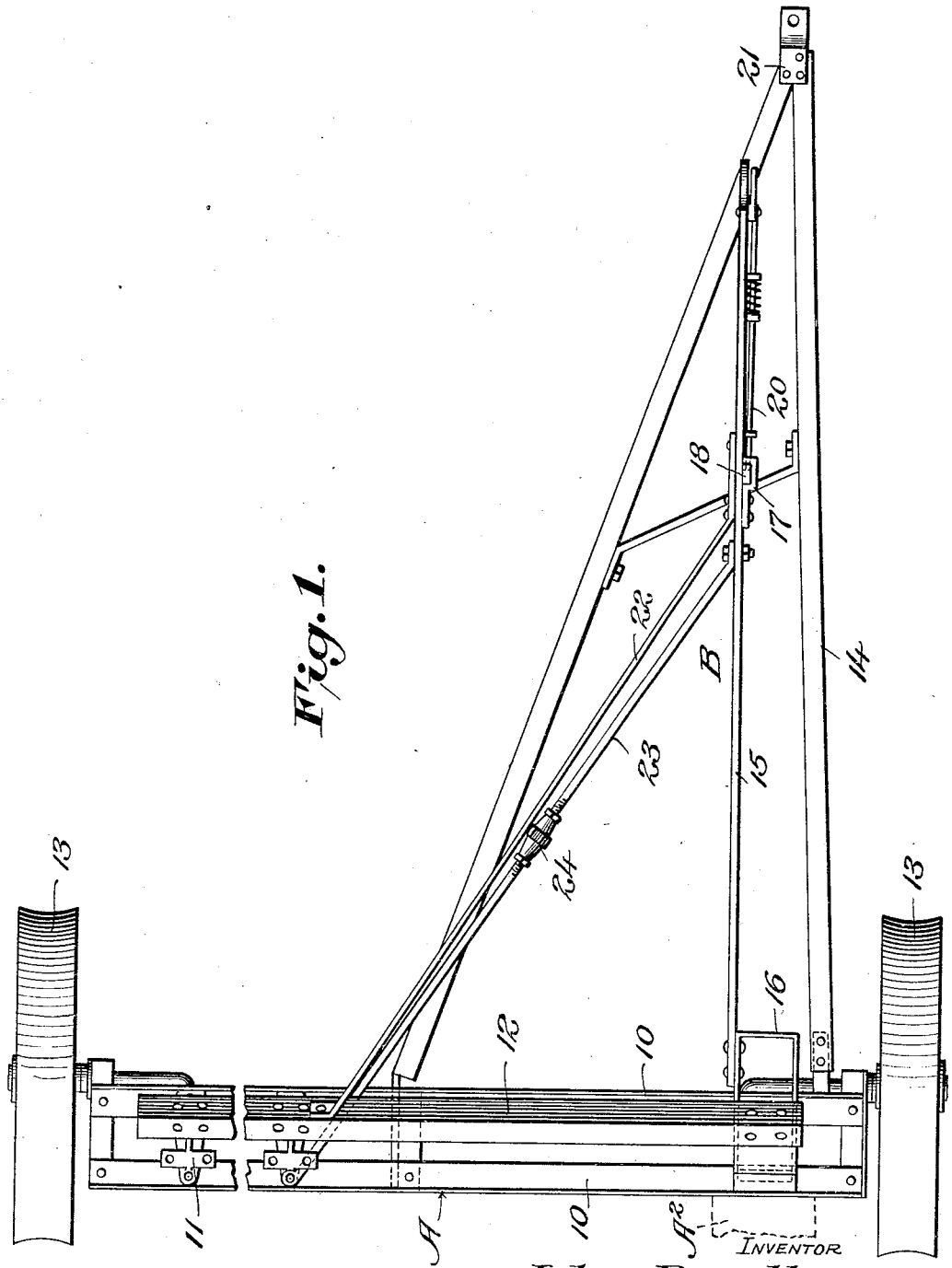

1,862,607

UNITED STATES PATENT OFFICE

JOHN POWELL, OF KOKOMO, INDIANA

FRAME BRACING AND ADJUSTING MEANS

Application filed May 15, 1930. Serial No. 452,709.

This invention relates to bracing means for frames and the like to prevent their deformation under the influence of torsional stresses, and has for its general object to provide a simple means for this purpose which is thoroughly efficient in operation.

While the means constituting the invention is capable of use in various different capacities, a particular example of its utility is in connection with harvesting machines or the like of the type wherein a frame is subjected to torsional stresses due to the weight of a mechanism or mechanisms mounted on and extending from the frame, the said mechanism or mechanisms, as the case may be, acting in the nature of a lever or levers tending to distort the frame by twisting same out of shape. In this connection, another object of the invention is to provide a means to prevent twisting of the frame which means may be applied with facility to existing machines substantially without alterations thereto.

Another object of the invention is to provide a means for the purpose stated which may be adjusted quickly and easily to compensate for any distortion of the frame which may take place, and, if desired, to rotatably adjust the frame to effect adjustments of the mechanism or mechanisms suspended therefrom.

With the foregoing and other objects in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:

Figure 1 is a top plan view of the mechanism constituting the present invention, showing its adaptation to the frame of a harvesting machine.

Figure 2 is a side elevation with the near wheel of the harvesting machine removed; and Figure 3 is a rear elevation.

The mechanism constituting the invention is of special utility in connection with harvesting machine frames of the type disclosed in my prior application serially numbered 311,195, for which reason said mechanism has been illustrated in the present instance as adapted to a harvesting machine frame of the type disclosed in said prior application. Inasmuch, however, as the invention is capable of beneficial employment in connection with other frames or their equivalents, and itself is capable of modification in various respects for adaptation to particular uses, it will be understood that the present drawings are intended merely as a showing of one specific embodiment and use of the invention to illustrate its utility and mode of operation, and are not to be construed as limiting the invention either structurally or in respect to the different uses to which it may be put. Furthermore, for the sake of simplicity and clearness, the illustration in the present instance has been confined to those portions of the harvesting machine frame with which the present invention is directly concerned.

Referring now to the drawings in detail, A designates, generally, that portion of a harvesting machine frame with which the present invention is directly concerned, while B designates, generally, the mechanism constituting the present invention for preventing distortion of the frame A under the influence of torsional stresses.

In the present instance the frame A consists of a pair of spaced, parallel angle iron members 10, 10, brackets 11 mounted on and rising from said members and serving to connect them together, and a rail 12 connecting the upper ends of said brackets. This frame extends transversely of the machine and is suitably mounted on wheels 13, 13 located at the ends thereof, draft means in the form of a V-shaped frame or tongue 14 extending forwardly from said frame near one end thereof.

At A', in Fig. 2, is illustrated a harvesting mechanism which is mounted at its rear end on the frame A at a point near the end of said frame remote from the tongue 14 and which extends forwardly from said frame. Ordinarily, another mechanism A², illustrated by dotted lines in Fig. 2, is secured to and extends rearwardly from the frame A at a point near the other end thereof. Obviously, therefore, the weight of the mechanism A' tends to rotate or twist the frame A in a clockwise direction, while the weight of the mechanism A² tends to rotate or twist said frame in a counterclockwise direction as viewed in Fig. 2, with the result that the forward end of the mechanism A' may assume an inoperative or undesirable position, as shown in full lines in Fig. 2, below its correct operative position shown by the dot and dash lines in said figure, and the rear end of the mechanism A² may likewise sag to an inoperative or undesirable position. Thus, in the present particular instance, the object of the mechanism B is to hold the frame A against distortion or twisting under the influence of the torsional stresses set up therein by the weight of the forwardly and rearwardly extending mechanisms A' A², so as to maintain the ends of said mechanisms against sagging from a predetermined operative position.

Referring now in detail to the mechanism B, it will be observed that same is inclusive of a lever 15 which is secured rigidly at its rear end to an upper portion of the frame A and extends forwardly from said frame above the tongue 14. For convenience in attaching said lever to the frame A, one of the brackets 11 may be provided with a forward extension 16 to which the end of the lever may be riveted or bolted.

Near its forward end the lever 15 is provided with suitable guide means 17 through which extends the upper end portion of a toothed bar 18 which is mounted at its lower end on the tongue 14 as indicated at 19. A latch 20 of any suitable type is carried by the lever 15 for cooperation with the teeth of the bar 18 to hold the lever in any desired adjusted position with respect to the tongue.

The tongue 14 is provided at its forward end with suitable means 21 whereby it is adapted for attachment to a tractor or the like and is thus held against upward or downward movement, assuming, of course, that the tractor and the machine are stationary or that they are travelling over a level surface.

Thus, as is manifest, by raising or lowering the forward end of the lever 15, the portion of the frame A in line with and a short distance to either side of the vertical plane of said lever may be rotatably adjusted either in a clockwise or in a counterclockwise direction, and since the mechanism A² is secured to the frame A, substantially in line with said lever, it is apparent that by proper manipulation of said lever the rear end of the mechanism A² may thus be adjusted to and secured at a desired elevation.

In order that portions of the frame A remote from the lever 15 may be rotatably adjusted by said lever and held by the latter against torsional distortion, a forward end portion of said lever is connected by diagonal brace members 22 and 23, with top and bottom portions, respectively, of the frame A near the end of the latter remote from the lever. Thus, in view of the fact that the mechanism A' extends forwardly from the frame A and tends constantly to twist the latter in a clockwise direction as viewed in the drawings, the brace 22 constitutes a compression member and the brace 23 a tension member cooperating with one another and with the lever 15 to prevent torsional distortion of the frame under the influence of the weight of the mechanism A'.

One or both of the braces 22, 23 may be provided with a turnbuckle or equivalent means 24 whereby the effective length of said brace or braces may be varied to effect, independently of adjustments of the lever 15, twisting adjustments of that portion of the frame A which is disposed remote from the lever 15.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In combination with a structure which is subjected to torsional stresses, a lever secured rigidly to said structure and extending therefrom for rotatably adjusting said structure, means to secure said lever in different adjusted positions, and a pair of braces each connected with said lever at a point spaced from said structure and, respectively, connected with said structure at points spaced transversely thereof and remote from the point of connection of the lever therewith.

2. In combination with a structure which is subjected to torsional stresses, a lever secured rigidly to said structure and extending therefrom for rotatably adjusting said structure, means to secure said lever in different adjusted positions, a pair of braces each connected with said lever at a point spaced from said structure and, respectively, connected with said structure at points spaced transversely thereof and remote from the point of connection of the lever therewith, and means for varying the effective length of at least one of said braces.

3. In combination with a structure which is subjected to torsional stresses, a lever secured to said structure at and extending therefrom for directly rotatably adjusting that portion of the structure adjacent to the point of connection of the lever therewith, and means connecting an outer portion of said lever and a portion of said structure located remote from the point of direct connection of the lever therewith whereby adjustments of the lever positively effects rotatable adjustments of the last mentioned portion of said structure.

4. In combination with a harvester frame having a mechanism secured thereto and imposing torsional stress thereon, a lever secured to said frame at a point remote from said mechanism for rotatably adjusting said frame, means for securing said lever in different adjusted positions, and a pair of braces each connected with said lever at a point spaced from said frame and respectively connected with said frame at points spaced transversely thereof and adjacent to said mechanism.

5. In combination with a harvester frame having a mechanism secured thereto and imposing torsional stress thereon, a lever secured to said frame at a point remote from said mechanism for rotatably adjusting said frame, means for securing said lever in different adjusted positions, a pair of braces each connected with said lever at a point spaced from said frame and respectively connected with said frame at points spaced transversely thereof and adjacent to said mechanism, and means for varying the effective length of at least one of said braces.

6. In combination with a wheeled frame and a tongue extending substantially horizontally therefrom, a lever secured rigidly to an upper portion of said frame and extending therefrom in overlying relation to said tongue, means between said tongue and said lever for securing the latter in different adjusted positions towards and from said tongue, a brace connecting an outer portion of said lever with an upper portion of said frame at a point along the latter spaced from the point of direct connection of the lever therewith, and a second brace connecting an outer portion of said lever with a lower portion of said frame at a point along the latter spaced from the point of direct connection of the lever therewith.

7. In combination with a wheeled frame and a tongue extending substantially horizontally therefrom, a lever secured rigidly to an upper portion of said frame and extending therefrom in overlying relation to said tongue, means between said tongue and said lever for securing the latter in different adjusted positions towards and from said tongue, a brace connecting an outer portion of said lever with an upper portion of said frame at a point along the latter spaced from the point of direct connection of the lever therewith, a second brace connecting an outer portion of said lever with a lower portion of said frame at a point along the latter spaced from the point of direct connection of the lever therewith, and a turnbuckle included in at least one of said braces for varying the effective length thereof.

In testimony whereof I hereunto affix my signature.

JOHN POWELL.